A. S. Bird.
Steam Whistle.

Nº 91,704.      Patented Jun. 22, 1869.

Witnesses;
W. J. Chamberlain

Inventor;
Mrs. A. S. Bird
by
J. Fraser & Co.
attys

United States Patent Office.

AMELIA S. BIRD, OF BUFFALO, NEW YORK, ASSIGNOR TO HERSELF AND PETER PEUGEOT, OF SAME PLACE.

Letters Patent No. 91,704, dated June 22, 1869.

---

IMPROVEMENT IN STEAM AND OTHER WHISTLES.

---

The Schedule referred to in these Letters Patent and making part of the same.

---

*To all whom it may concern:*

Be it known that I, AMELIA S. BIRD, of Buffalo, in the county of Erie, and State of New York, have invented certain new and useful Improvements in Whistles; and I do hereby declare that the following is a full and exact description thereof, reference being had to the accompanying drawings, making part of this specification, in which—

Figure 1:
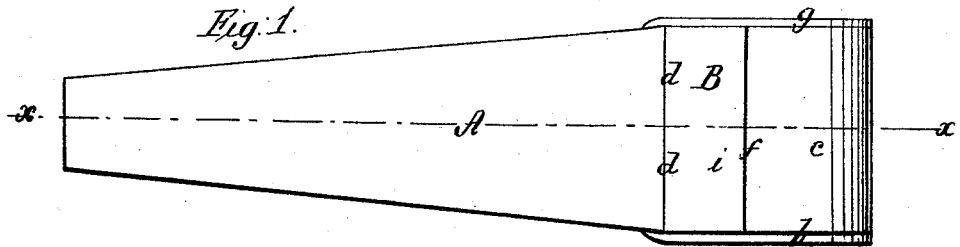
Figure 2:
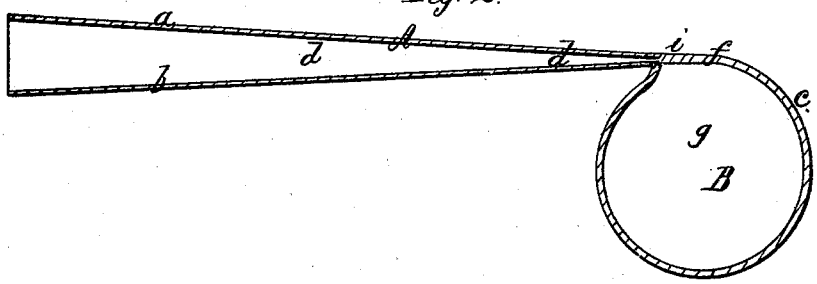

Figure 1 is a plan of a large whistle;

Figure 2, a longitudinal section; and

Figure 3:
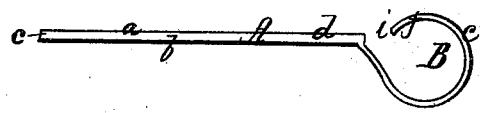

Figure 3, a side elevation of a small whistle, with the sides of the chamber removed.

Like letters of reference indicate corresponding parts in all the figures.

My invention consists in forming a peculiarly-simple metal whistle, to be blown either by wind or by steam.

In the drawings—

A represents the main portion, or stem of the whistle, made from a single piece of metal, the larger, for steam, preferably of brass, and the smaller, to be blown by the mouth, of tin, or its equivalent.

The tin whistle, fig. 3, I form throughout of a single piece, the sides of a flat piece of tin being bent over and overlapping each other, but leaving a space between the top $a$ and bottom $b$, forming a tube for the wind to pass through, shown at $d$.

One end, $c$, of the bottom is made longer than the top, and is bent down and curved over in the shape of a hook, its curved end $f$ coming within a short distance of the space, or tube $d$, where the wind issues.

The width of this hook-part corresponds with the main stem A, after its sides are bent over, forming the tube.

To operate the whistle, the thumb and finger are each placed against and hold the sides of the hooked part $c$, thus forming a chamber, B, but open at the top, shown at $i$.

The end $e$ is placed in the mouth, and the breath forced into it. The air rushes through the narrow space, or tube $d$, against the bent edge $f$, which acts as a reed, and cuts the air, and the hollow chamber B, making a sounding-box.

In the small whistles, nothing but the application of the fingers of the blower are needed to make a complete chamber, but in larger whistles it will be necessary to put on side-pieces $g\ h$. (See figs. 1 and 2.)

As a toy-whistle, it is the simplest and cheapest possible, besides producing a much louder and stronger tone than most whistles.

The same advantages apply to its being made and used for a steam-whistle, as the device is very cheap in construction, and produces a sound superior in tone, and which can be heard further than those now in use.

What I claim as my invention, and desire to secure by Letters Patent, as a new article of manufacture, is—

1. The whistle, consisting of stem A, sounding-box B, reed $f$, and side-pieces $g\ h$, combined and operating substantially as specified.

2. The whistle, consisting of stem A, reed $f$, and open-ended sounding-box B, combined and operating substantially as specified.

In witness whereof, I have hereunto signed my name, in the presence of two subscribing witnesses.

AMELIA S. BIRD.

Witnesses:
J. R. DRAKE,
ALBERT HAIGHT.